April 23, 1968  E. V. GARNETT  3,379,392
REEL TRAILER

Filed June 13, 1966  5 Sheets-Sheet 1

INVENTOR.
Edward V. Garnett
BY
Van Valkenburgh & Lowe
ATTORNEYS

April 23, 1968  E. V. GARNETT  3,379,392
REEL TRAILER

Filed June 13, 1966  5 Sheets-Sheet 2

INVENTOR.
Edward V. Garnett
BY
ATTORNEYS

INVENTOR.
Edward V. Garnett
BY Van Valkenburgh & Lowe

ATTORNEYS

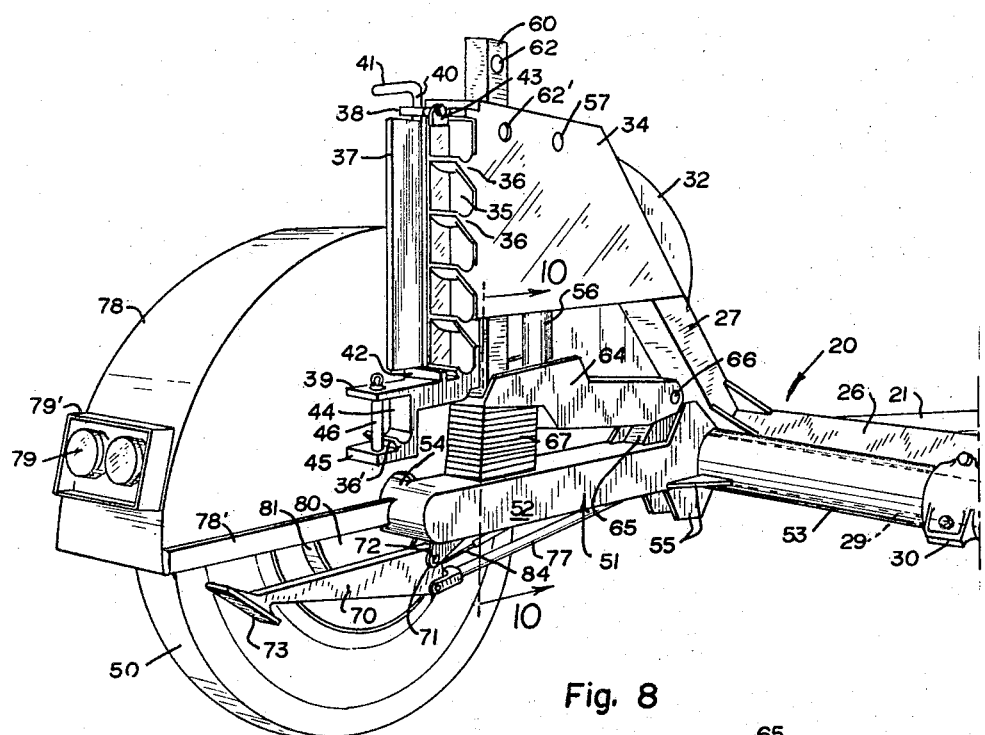
Fig. 8
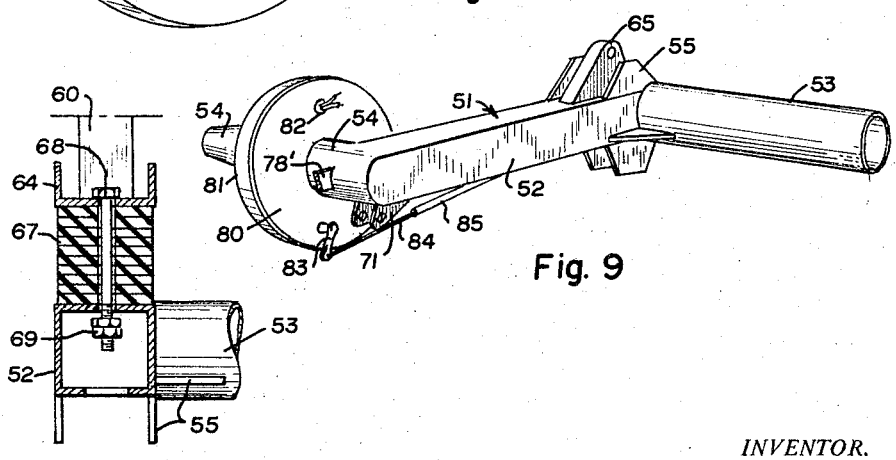
Fig. 9
Fig. 10
INVENTOR.
Edward V. Garnett
BY
ATTORNEYS April 23, 1968     E. V. GARNETT     3,379,392
REEL TRAILER
Filed June 13, 1966     5 Sheets-Sheet 5
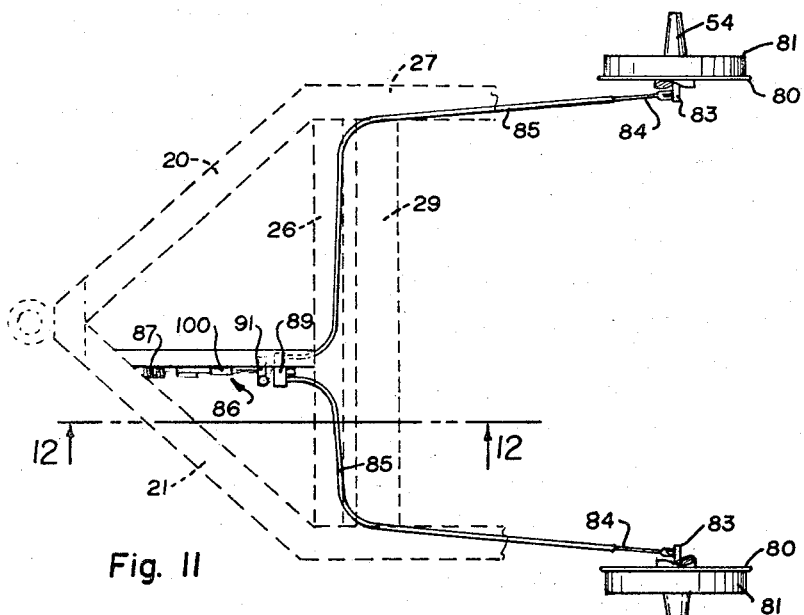
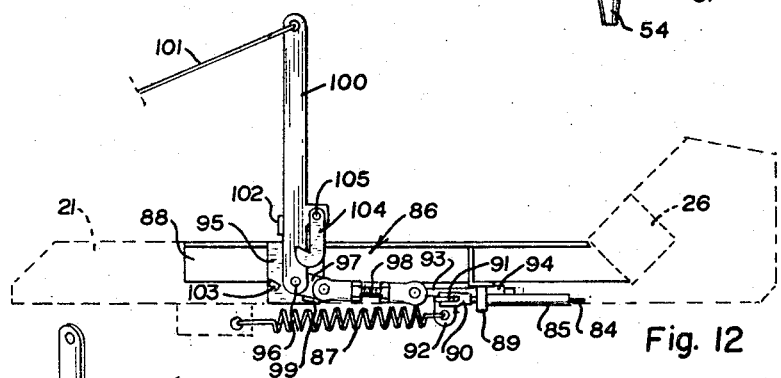
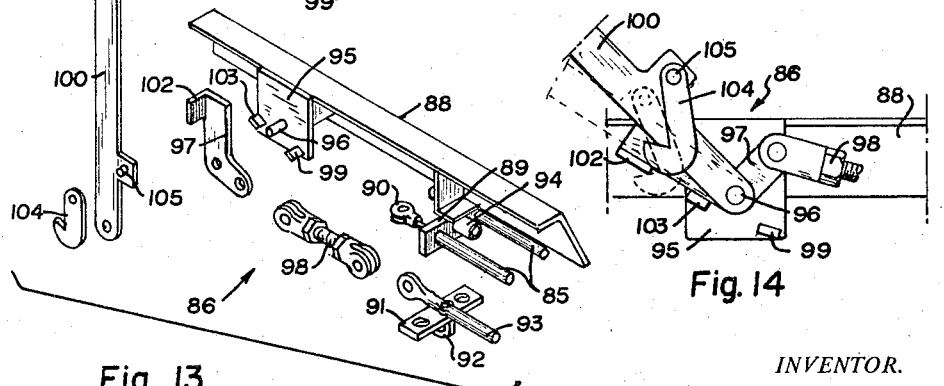
INVENTOR.
Edward V. Garnett
BY *Van Valkenburgh & Lowe*
ATTORNEYS

United States Patent Office 3,379,392
Patented Apr. 23, 1968

3,379,392
REEL TRAILER
Edward V. Garnett, Denver, Colo., assignor to Eaton Metal Products Company, Denver, Colo., a corporation of Nebraska
Filed June 13, 1966, Ser. No. 557,070
11 Claims. (Cl. 242—86.5)

ABSTRACT OF THE DISCLOSURE

A cable reel trailer having a yoke-shaped main frame with spaced legs extending upwardly at the rear, a pivoted rocker beam at each side below the legs, a rear wheel on each rocker beam and an extension and retraction device, such as a hydraulic cylinder, for raising and lowering the rear end of the main frame, which carries a support at each side for the spindle bar of a cable reel. A pivoted arm, interposed between the leg and rocker beam at each side, receives the thrust of the hydraulic cylinder and bears against a coil spring on the rocker beam.

---

This invention relates to trailers for cable reels, to facilitate their transportation and use as when the cable is being payed off the reel. As such, the invention will be hereinafter referred to as a reel trailer.

Wire rope, power transmission lines, telephone cables, and like cables are often of a substantial length and are ordinarily wound upon flanged spool-like reels which may be quite large and heavy. When necessary to pay out cable, the reel is usually mounted and supported upon a horizontal shaft so it may rotate as the cable is pulled therefrom. For field use, a wheeled trailer may be adapted to carry and support a reel upon a shaft so that the reel will not have to be taken off the trailer when the cable is to be payed from it.

The present invention is an improved construction of an open-frame reel-supporting trailer and it features a vertical array of supports at each side of a vertically movable frame which may receive and hold the ends of a shaft in a reel when the frame is lowered, and which may be lifted once the reel-supporting shaft is set in position. This permits a heavy, cable-loaded reel of any diameter to be quickly mounted until it is actually in position in the trailer. The construction also features an individualized wheel-suspension system. In many instances the operation of unwinding reels must proceed in regions of rough terrain where the trailer cannot be set in a level position without special preparation, such as leveling the ground surface or building a special base structure. Such undesirable and time-consuming preparations are eliminated. Further, improvements in the trailer construction include a simplified arrangement of shock-absorbing spring means to permit it to travel over a rough road without excessive bouncing, simple adjustable outrigger arms to better hold the trailer in place once it is set for unwinding operations and an emergency brake system which may be manually operated or which may be associated with a tractor pulling the trailer.

Accordingly, the objects of the present invention are to provide a novel and improved reel trailer which: is a simple, neat-appearing, rugged and durable unit capable of receiving and holding reels of any ordinary size; is adapted to receive a heavy, cable-loaded reel and to lift the same from the ground as for transportation without requiring that the reel be lifted or handled in any other manner except by rolling it into position within the trailer; is adapted to be easily and quickly connected to the hitch of a towing vehicle; includes a simplified arrangement of shock absorbing springs to permit it to be pulled over rough roads without undesirable bouncing and shock; includes an individualized, adjustable wheel suspension system for smoother towing action and to permit the unit to be leveled upon rough terrain as when cable is to be payed off from the reel; includes a simplified automatically retractable supporting wheel for the tongue portion of the trailer to facilitate managing the unit when disconnected from a tow truck; is adapted to be securely held in position against the forces required to pay cable from the reel; and includes a simple arrangement of an emergency braking system associated with the wheels of the trailer.

With the foregoing and other objects in view, all of which more fully hereinafter appear, my invention comprises certain constructions, combinations and arrangements of parts and elements as hereinafter described, defined in the appended claims and illustrated in preferred embodiment in the accompanying drawings in which:

FIGURE 8 is a perspective view of the inner portion of the left side of the apparatus, as looking towards the rear of the apparatus.

FIGURE 9 is a rear perspective view of a wheel-supporting rocker frame.

FIGURE 10 is a fragmentary sectional detail as taken from the indicated line 10—10 at FIG. 8 but on an enlarged scale.

FIGURE 11 is a diagrammatic plan view outlining portions of the frame in broken lines, and illustrating in full lines the emergency brake system of the unit.

FIGURE 12 is a side elevational view of the emergency brake trip assembly, as taken from the indicated line 12—12 at FIG. 11 but on an enlarged scale.

FIGURE 13 is an isometric exploded view of certain components constituting the emergency brake trip assembly shown at FIG. 12.

FIGURE 14 is a fragmentary portion of the showing at FIG. 12 but on an enlarged scale and with the components illustrate as being shifted to an alternate brake-locking position.

Figure 1:
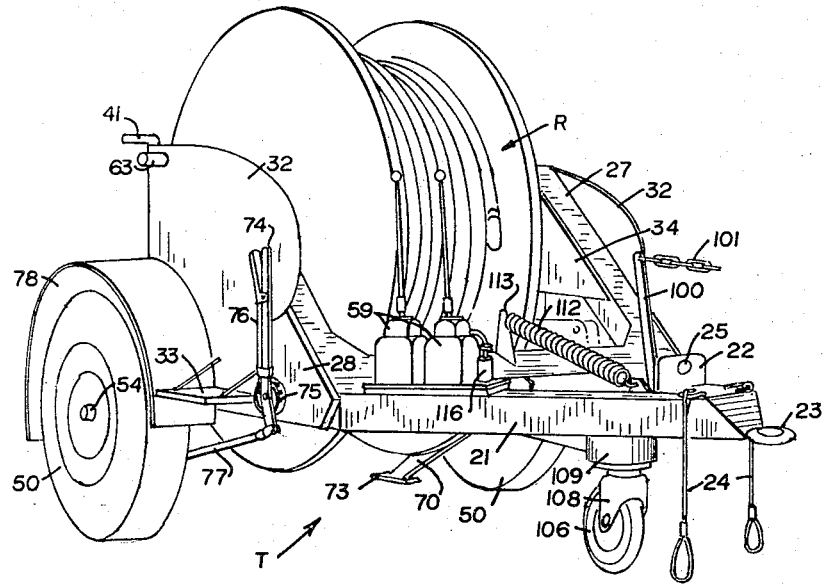
FIGURE 1 is a perspective view of the improved reel trailer, looking towards the front, right side of the trailer, and with the trailer carrying loaded reel as in a position when the trailer is being used.
Figure 2:
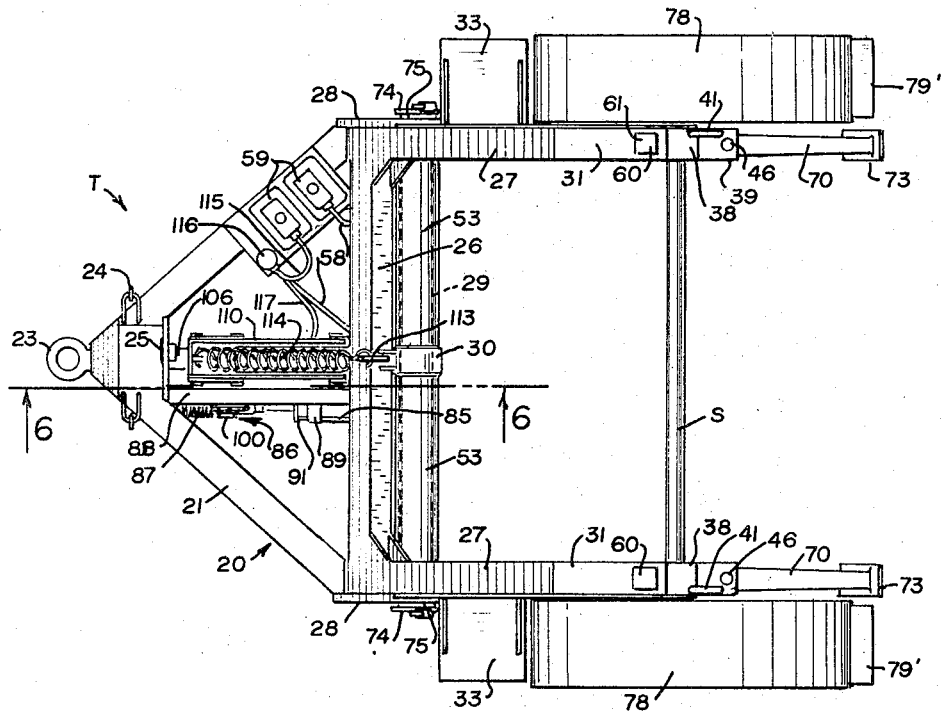
FIGURE 2 is a plan view of the trailer shown at FIG. 1 but with the reel being removed.

Referring more particularly to the drawing, the improved reel trailer T is, in plan, in the general form of an enlarged wheel-mounted, Y-shaped yoke adapted to hold a reel R between the legs of the yoke. This yoke frame 20 is a structurally rigid arrangement of reinforced tubular members and plate members which are welded together according to regular shop practice. This frame 20 is symmetrical with respect to a vertical plane through the central longitudinal axis of the unit. A tongue 21 is formed by two forwardly converging, square-sectioned tubular frame members closed together at the forward end by a gusset plate 22. Conventional tractor connecting means are located at this front end including an eye 23, safety cables 24 and an electrical connector socket 25 on an upstanding portion of the gusset plate 23. The rearward ends of the tongue members 21 are spread apart by a transverse square sectioned tubular beam 26 to form the crotch of this yoke-shaped frame 20. Thence, a pair of spaced, parallel frame legs 27 extend rearwardly from the crotch, but upwardly out of the plane of the tongue members 21 at an angle of approximately 45 degrees. The legs 27, strong, square-sectioned tubular units, form the primary elements of a wide, slot-like cradle wherein a cable reel R of any normal size may be suspended, as upon an axle shaft S which extends through the reel so that its ends may be carried in sockets at the rearward end of the frame as hereinafter described.

The crotch of the frame is reinforced by heavy gusset plates 28 at each outer side of the frame. Each gusset plate 28 is formed as a triangular member with a first, forward portion lapping the rear end of a tongue beam 21, a second portion extending rearwardly and upwardly to lap the front end of a leg 27 and a third portion being underneath the leg to provide a surface support for one end of a transversely disposed, rigid, tubular shaft 29. This shaft 29, positioned immediately behind the crotch beam 26, is of a comparatively large diameter and is adapted to hold a pair of rocker-beam-wheel support members as hereinafter described. The center of the shaft 29 is connected and secured to the central portion of the center frame by a connector 30 between the members.

Each rearwardly upsloped leg 27 is formed with a flat top portion 31 which holds lift members, hereinafter described. To complete the frame, each leg 27 is enclosed by inner and outer side plates. The outer cover plate 32 overlies the leg 27 and extends downwardly therefrom to a level adjacent to the bottom of the gusset plate 28 to provide for a side enclosure for the trailer. A small platform 33 outstands from this plate 32 immediately behind the gusset plate. The inner plate 34 covers only the upper portion of the frame leg 27 to provide clearance for wheel supporting rocker beams hereinafter described.

The rearward end of the frame 20 is closed by a vertically-disposed end plate 35 having a rack-like array of rearwardly extending hooks 36, each of which is adapted to hold an end of a reel axle shaft S. These hooks are arranged one above the other so that a reel R of any diameter may be mounted upon the trailer. The mode of so mounting a reel consists first in lowering the trailer, in a manner hereinafter described. Then a reel R having the shaft S through its center may be rolled on the ground surface in an ordinary manner and thence between the legs of the trailer and into position where the ends of the shaft S move onto a pair of opposing hooks 36. Then the trailer is lifted with the reel as will be hereinafter described.

When the shaft S is in place in a pair of hooks 36, a pair of vertically disposed gates 37 at the rear of the frame may be swung against the array of hooks 36 to lock the shaft and lower extension plates 38 and 39, at the top and bottom of the end plate 35. The gate is pivoted in these plates by a vertical shaft 40 at one edge thereof which extends through holes near the outward sides of the plates 38 and 39, the upper end of the shaft extending above the plate 38 and being turned outwardly to form a handle 41 to facilitate the turning of the gate. Each gate 37, a heavy bar-shaped member, may thus swing from an open position to a closed position and is locked in the closed position by a short transverse bar 42 upon the lower plate 39. This bar forms a socket into which the bottom end of the gate 37 drops when it is closed, requiring that the loosely fitting gate be lifted above this socket and onto the bar 42 before it can be opened. This lock acts as an effective safety precaution to prevent accidental opening of the gate and an end of a reel shaft S from falling off a hook 36. As a further safety measure, the upper extension plate 38 is notched at its inner side and a triangular, pendulated detent 43 is pivotally suspended in this notch directly above the gate when it is closed and in the socket behind the bar 42. The detent 43 is formed with a flat underside which abuts the top edge of the gate to lock it in position and it is necessary to manually swing the detent clear of the gate before it can be raised to be opened.

To provide a lowermost socket 36' for small diameter reels, each lower plate 39 is extended rearwardly of the gate position, with a short end plate 44 depending from this extension to hold the socket 36' in place. The socket 36' is supported on a rearwardly extended lowermost plate 45, and holes through the rearward ends of the plates 39 and 45 receive a lock pin 46 to keep a reel shaft S in the lowermost socket 36' when desired.

The trailer is carried upon a pair of conventional, rubber-tired wheels 50 which are sized and designed to support the entire weight of the trailer and any reel which may be loaded thereon. Each wheel is individually suspended on a rocker frame 51 such as illustrated at FIG. 9. Each rocker frame 51 includes a longitudinally disposed beam 52, a structurally rigid, square sectioned tube. An inwardly extending, transversely disposed bearing sleeve 53 is connected to the forward end of the beam 52 and is adapted to be pivotally mounted upon the frame shaft 29 to permit the beam 52 to swing about the shaft 29 in a vertical, longitudinal plane. Each sleeve 53 extends inwardly towards the center of the shaft 29 to abut against the central connector 30 and it is to be noted that any suitable arangement of internal bearings and lubricating means may be used within this sleeve to provide easy motion of the rocker frame about the shaft 30.

An outwardly extending, lateral wheel spindle 54 outstands from the rearward end of the beam 52 at a position beyond the frame cover plate 32 to dispose the wheel 50 outwardly of the frame of the apparatus. A considerable weight is carried upon its apparatus and it is to be noted that each longitudinally disposed frame member 51 must be able to resist the torsional effect of the load on this offset wheel spindle, necessarily at one side of the beam 52. Accordingly, the connection of the beam 52 to the sleeve 53 is reinforced by suitable gusset plates 55.

Figures 3, 4, 5:
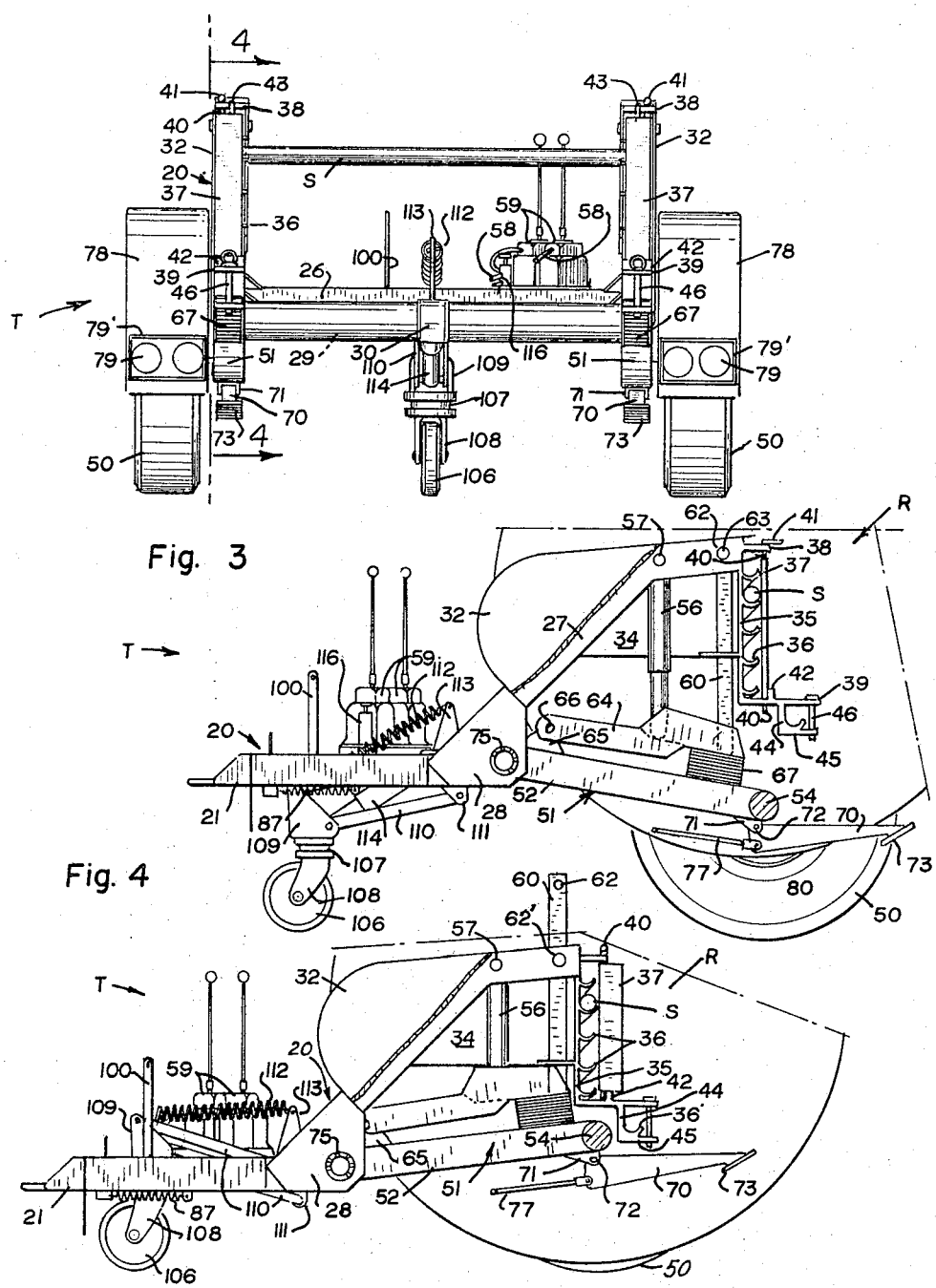
FIGURE 3 is a rear elevational view of the trailer.
FIGURE 4 is a side elevational view, partially in section, as substantially taken from the indicated arrow 4—4 at FIG. 3, this section illustrating side plate as being removed from the framework to show constructions otherwise hidden from view, the figure also showing portions of a cable reel as being carried by the apparatus.
FIGURE 5 is a side elevational sectional view similar to FIG 4, but showing the apparatus as being lowered as to permit the reel to be removed from the apparatus.

The rigid frame 20 is adapted to be supported above the rocker frames 51, pivotally connected thereto, and each side of the rearward end of the frame 20 is raised upwardly from the wheel-mounted rocker frames to a position illustrated at FIG. 4. or is lowered downwardly and upon the rocker frame 51 to the position illustrated at FIG. 5. This raising and lowering action, of the frame 20 with respect to each rocker frame 51, is effected by a hydraulic jack 56 which is mounted underneath the flat 31 of a frame member 27 between the side plates 32 and 34 underneath the flat 22 of the frame leg 18. The frame member 27 is suitably socketed to hold the end of the jack and a pin 57 holds the jack in place. Each hydraulic jack includes a pressure line 58, partially shown, which extends forwardly along the frame of the trailer and to a pump 59 mounted upon the top of the trailer, there being an individual pump for each jack. Supplementing the jack 56, a lock bar 60, a square-sectioned member, is slidably carried in a vertical socket 61 near the rearward end of its frame leg 27 to extend downwardly to the rocker frame 51. The lock bar 60 is provided with a transverse hold 62 through its top portion which will register with holes 62' in the frame member 27 when the frame is fully raised and the lock bar completely lowered. The bar 60 is then secured in position by a lock pin 63 which may be extended through the holes 62 and 62' when they register. This lock pin may be held in position in a suitable slide and may have interlocking means, not shown, associated with it to prevent an accidental disconnection of the pin from the bar. So locked in position, the frame 20 is held in an elevated position by the lock bars to relieve all pressure upon the hydraulic jacks.

The jack 56 and bar 60 at each side of the unit do not directly abut against the rocker arm 51 below them, but they abut against an arm 64 which is hinged to the rocker frame beam 52 to overlie the frame beam. This arm 64 is formed as a flat, rigid member reinforced by side plates. Its forward end is positioned upon a pivot lug 65 upstanding from the top of the rocker beam 52 adjacent to the sleeve 53. It is pivotally connected thereto as by a pin 66 which extends through suitable holes in the lug 65 and through the forward end of the arm 64. The upper surface of the rearward portion of each arm 64 is adapted to contact the hydraulic jack 56 and the lock bar 60 and the underside of the arm is adapted to contact a spring pad 67 positioned between the arm and the top of the rocker frame. This pad, a comparatively thick member, is made up of a number of layers of a resilient type of rubber having a high hysteresis effect. The pad, rectangular in form, is secured in place by a pair of loosely fitting bolts 68 which extend through holes in the arm 64, the pad 67, and the upper surface of the rocker frame 52 as illustrated at FIG. 10. The lower ends of the bolts carry lock nuts 69 secured to the bolt below the surface of the rocker frame 52 to permit a slight degree of bouncing, which is generally not necessary when the trailer is loaded with a heavy reel, for it rides very smoothly and the spring pad effectively absorbs shocks and minimizes bouncing on rough roads.

In order to hold the trailer when it is to be parked for reel unwinding operations, wheel brakes are provided as will be described. Also, each rocker frame 50 includes a rearwardly extended outrigger arm 70 which is secured to ears 71 at the rear underside of the frame beam 52 as by a pivot pin 72. This arm 70, normally held above the ground surface and extended rearwardly of the rocker frame, is adapted to be lowered to contact the ground and is provided with a suitable contact shoe 73. Thus, the two outrigger arms may be lowered to dig into a hard ground surface to prevent the trailer from slipping rearwardly. This is quite important when a stiff lead sheathed telephone cable or the like is being unwound from a reel because the pull on the reel to unwind and also to straighten the cable is apt to be considerable.

Each outrigger arm is raised and lowered by a hand lever 74 connected to an outstanding, circular pivot head 75 at the outer face of each main gusset plate, conveniently at the axis position of the shaft 29. The pivot head 75 is formed as a shaft in an arcuate rack while the hand lever includes a manual detent 76 adapted to engage and to lock the hand lever at any position by engaging a tooth of the head rack. The lower end of the hand lever, extending below the head 17 is pivotally connected to one end of a compression link 77. The opposite end of the leg extending rearwardly to the outrigger arm is pivotally connected thereto by a pin 72', which is spaced at the same end of the outrigger arm but below the supporting pivot 72 a distance sufficient to easily raise and lower the outrigger arm 70 responsive to rotation of the hand lever.

To complete the assembly on each rocker frame 51 a suitable fender 78 may be secured thereto by connection with the base of the spindle 54 as by a rod 78'. Travel and signal lights 79 may be mounted in a suitable box 79' at the rear of the fenders as illustrated. The electrical circuits for these lights are not shown but may conveniently extend to the socket 25 for connection with any towing tractor lighting system.

Each rocker frame 50 includes a brake disc 80 on the spindle 54. This disc 80 is adapted to be closed by the wheel brake drum 81 and the disc carries actuator mechanisms and brake shoes, not shown, which are adapted to coact to move the shoes against wheel brake drums. It is contemplated that an electrically operated brake will be used on the trailer since electrical leads 82 at the disc may be easily connected with a controlled power supply at the towing vehicle as through the connector socket 25.

Such a brake is a conventional, common unit and it will also include a supplementary, mechanical brake means operated by pulling or releasing a small lever 83 outstanding from the bottom disc 77.

The lever 83 of each brake disc 80 is used for a mechanically operated emergency braking system in the reel trailer unit. To form this system each lever 83 is connected to a flexible cable 84 which is encased within a sheath tube 85 to extend forwardly to the front of the apparatus as in the manner shown in FIG. 11. There, the cables 84 connect with a trip lock mechanism 86 and a tension spring 87. When the trip lock 86 is released, the spring 87 pulls the levers 83 of both wheel discs to set the mechanical brakes. As illustrated in FIG. 11, each sheath tube 85 extends forwardly from the brake and turns inwardly at the crotch beam 26 to again extend forwardly to opposite sides of the trip lock mechanism 86 alongside a supporting member 88. This support member 88 is illustrated as a structural angle member held longitudinally between a tongue member 21 and a crotch beam 26 but at one side of the longitudinal center line of the unit to provide clearance for a front wheel which will be hereinafter described.

The forward ends of the sheath tubes 85 terminate in a short transverse block 89 mounted underneath the support bar 88, the block 89 including a pair of spaced holes into which the ends of the sheath tubes 85 fit with the ends of the cable extending through the block. They terminate as a pair of clevises 90. These spaced clevises are pivotally connected to a short transverse balance plate 91 having a centrally positioned lug 92 at its underside which connects with the spring 87 so that the forward pull of the spring 87 will set both brakes with the balance plate rotating to pull both cables evenly if the adjustments of the cables are not precisely the same.

The trip lock mechanism 86 is adapted to normally restrain the pull of the spring 87 by pushing against an eyebar 93 pivotally attached to the top of the balance plate 91 with a portion thereof extending rearwardly of the plate 91 and into a guide sleeve 94 at the center of the block 89. This sleeve permits a longitudinal shifting of the eyebar 93 and the balance plate attached thereto, but otherwise holds the assembly in place.

The trip mechanism 86 is mounted upon a plate 95 at the side of the support bar 88 and forwardly of the eyebar 93. This mechanism is carried upon a pivot 96 outstanding from the face of the plate and includes a short flat elbow 97 mounted on this pivot 96. The elbow 97 has a lower leg extending rearwardly towards the eyebar 93 and is connected thereto by a toggle link 98. The toggle link 98, a pair of opposing clevis heads adjustably mounted upon a short threaded bar, pivotally connect with the lower leg of the elbow 97 and the eyebar 93, and is of such a length as to properly tension the spring 87 when the leg of the elbow 97 is rotated downwardly to place the arm and the link in a common alignment. The leg is adapted to rotate downwardly a short distance past this point of common alignment to contact a stop lug 99 on the plate 95, at which position the pull of the spring holds the assembly in place, as illustrated at FIG. 12. Upwardly rotation of the leg, on the other hand, causes the leg and eyebar to buckle together to permit the spring 87 to pull the brake cables.

The elbow 97 includes an upper leg which is conveniently vertical when the lower leg is against the stop lug 99. A lever 100 is mounted on the pivot 96 to normally stand alongside the upright leg and to extend above the level of the tongue frame to a position where it is easily reached. A chain or cord 101 may be connected to this lever to be extended forwardly, as for connection to a towing tractor or to an anchor. If the trailer commences to roll backwards or is accidentally released, a pull of the cord 101 will rotate the lever 100. The lever 100 may also be pulled manually to set the brakes. Interconnection of the elbow 97 with this lever 100 is by an offset lug 102 at the forward side of the upright leg of the elbow, so that any forward pull of the lever engages this lug, to rotate the elbow upwardly and more the lower leg upwardly and past alignment with the toggle 98 to buckle the toggle and arm as explained. The compression of the spring snaps the lower leg and eyebar upwardly to the position illustrated at FIG. 14 and a stop 103 on the plate 95 limits this rotation. The lever 100 may then fall to any position or remain upright depending upon its tightness upon the pivot 96. To reset the apparatus the lever includes a hook 104 carried on a laterally offset pivot 105 which will swing over the edge of the lug 102 when the lever is moved forwardly and downwardly.

Figure 6:
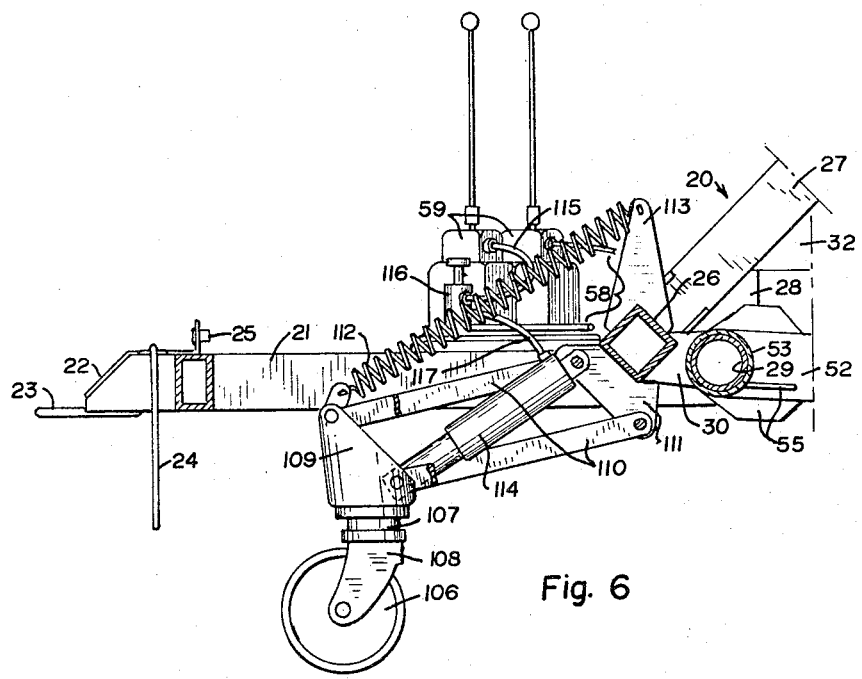
FIGURE 6 is a fragmentary sectional view of the front wheel assembly, as taken from the indicated line 6—6 at FIG. 2, but on an enlarged scale.
Figure 7:
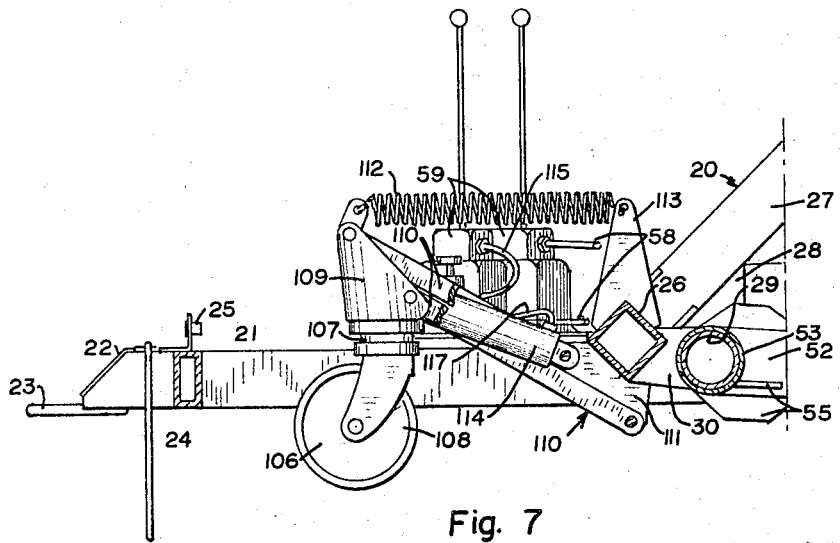
FIGURE 7 is a fragmentary sectional view similar to FIG. 6 but with the wheel assembly in its retracted position.

To complete the rear wheel, the front, tongue-end of this trailer is desirably supported by a caster wheel 106 in a vertically adjustable support frame 107. This support frame 107, illustrated in a lowered position at FIG. 6 and in a raised position at FIG. 7, functions first, to permit the front end of the trailer to be raised to any selected height for connection with a towing tractor and secondly, to lower or raise the front end of the trailer to any selected elevation when it is to be stabilized and leveled, as for removing or unwinding a reel carried on it, as in the manner illustrated at FIGS. 4 and 5. The caster wheel 106 may be of any conventional type including a vertically spindled yoke 108 in the frame 107 which carries the wheel and which includes a head 109 above the frame 107. The unit is supported by a parallel arm linkage 110 pivotally connected to the head 109 to an abutment 111 on the crotch beam 26. This linkage is adapted to swing in a vertical plane and is centered at the longitudinal axis of the unit. The linkage and the caster wheel are normally held in the upward retracted position, FIG. 7, by a spring 112 having one end connected to the top of the head 109 and the other end connected to an upstanding arm 113 on the crotch beam 26. Downward movement of the linkage and caster wheel is effected by a jack 114 disposed diagonally between the parallel linkage 110 with one end being pivotally connected to the abutment 111 and the other end being pivotally connected to the base of the head 109, whereby extension of the jacks effects a spreading of a linkage and a lowering of the wheel. This jack is conveniently actuated by one of the hydraulic pumps 59, and in order to use the same pump to actuate the jack 114 and a rocker arm jack 56, a line 115 from the pump 59 is directed into a three-way, shut-off type valve 116 which includes a line 58 to the jack 56 and a supplementary line 117 to the front wheel jack 114.

The operation and the use of the reel trailer is manifest from the foregoing description. A cable reel is mounted on the trailer by first lowering the trailer to roll a reel in position with a shaft S through its axis. The shaft is secured onto the proper hooks 36 by closing a gate 37. Next the trailer body is raised by jacks 56 to permit the lock bar 60 to be set by the pin 63. Next the front caster wheel 106 is raised to level the connector eye 23 with a trailer hitch, whereupon the trailer may be transported to the point of use. The front wheel is first lowered and set to level the trailer. The outrigger arms may then be lowered and the brakes set by pulling the lever 100, and the reel is ready for unwinding. If the terrain on which the trailer is set is not level, a lock bar 60, at the high side of the unit may be released and the hydraulic jack 56 may be used to hold up that side by simple adjustments with the pump 59.

I have now described my invention in considerable detail. However, it is obvious that others skilled in the art can devise and build alternate and equivalent constructions which are nevertheless within the spirit and scope of my invention. Hence, I desire that my protection be limited only by the proper scope of the appended claims.

What is claimed is:

1. A reel trailer adapted to support an axle shaft of a cable reel, comprising:

(a) a yoke-shaped main frame having a transversely disposed beam member defining a crotch, a tongue extending forwardly of the crotch to normally lie in an approximately horizontal plane, a leg at each side of the crotch beam extending rearwardly therefrom and upwardly with respect to the plane of the tongue and means depending from the rearward end of each leg for holding said reel axle shaft;

(b) a rocker beam at each side pivotally connected to the main frame adjacent to the crotch beam and extending rearwardly underneath the corresponding main frame leg;

(c) a wheel mounted on each rocker beam at a position spaced from said pivotal connection; and (d) extension and retraction means between each leg and the rocker beam therebelow adapted to pivot the rocker beam with respect to the main frame whereby to raise and lower the rearward end of the main frame with said wheels on a ground surface.

2. In the reel trailer defined in claim 1, wherein: a transverse shaft is carried on the main frame behind the crotch beam; and each said rocker beam includes a laterally disposed sleeve carried upon said shaft.

3. In the reel trailer defined in claim 1, wherein:
a front wheel supports said tongue; and
a vertically adjustable means raises and lowers said front wheel, whereby to permit the tongue to be raised and lowered to facilitate connecting the same to a tractor hitch and to level the frame as desired when it is being raised and lowered by said rocker frame.

4. A reel trailer as defined in claim 1, including:
a brake system for the wheels thereof having a lever extending therefrom;
a cable extending from each lever to each side of a common balance plate at the forward tongue section thereof;
a normally tensed pull spring connecting with the central portion of the balance plate and adapted to normally pull the cables and set the brakes; and
a trip mechanism adapted to be set to resist the pull of the spring to relieve tension from the cables but to be tripped to release the spring and to set the brakes.

5. A reel trailer as defined in claim 1, including:
an arm between the leg and the rocker beam having one end pivotally connected to the rocker beam adjacent to the aforesaid pivotal connection; and
resilient means between said arm and said rocker beam, said extension and retraction means being disposed between said leg and said arm.

6. In the organization defined in claim 5, wherein:
said resilient means includes a pad of elastomer having the general characteristics of rubber.

7. In the reel trailer defined in claim 1, wherein:
said extension and retraction means includes a hydraulic jack; and
a lock bar is adapted to be affixed to said leg when said leg is at a maximum upward extension.

8. In the reel trailer defined in claim 1, wherein said shaft holding means comprises:
an upright plate;
an array of hooks outstanding from said plate; and
locking means for holding said shaft in position upon a selected hook.

9. In the reel trailer defined in claim 8, wherein:
said locking means includes a gate adapted to be shut against the rear of said hooks; and
socket means below said gate adapted to receive and hold said gate in position when closed.

10. A reel trailer adapted to support an axle shaft of a cable reel, comprising:
yoke-shaped main frame means having a forwardly extending tongue for connecting said trailer to a power vehicle;

a leg joined to each side of said frame means extending rearwardly and upwardly with respect to said tongue;

means adjacent the rearward end of each leg for holding said reel axle shaft;

a rocker beam at each side of the main frame means, pivotally connected to the main frame means and extending rearwardly in a plane below the corresponding main frame leg;

a wheel mounted on each rocker beam at a position spaced from said pivotal connection; and extension and retraction means for each said rocker beam, adapted to pivot said rocker beam with respect to said main frame, whereby to raise and lower the rearward end of the main frame with said wheels on a ground surface.

11. A reel trailer as defined in claim 10, wherein:

each side of said trailer includes a pivoted arm extending rearwardly between said leg and said rocker beam above said rocker beam; and resilient means operably positioned between said arm and said rocker beam, with said extension and retraction means being disposed between said leg and said arm.

References Cited

UNITED STATES PATENTS

| | | | |
|---|---|---|---|
| 2,759,682 | 8/1956 | Garnett | 242—86.5 |
| 2,867,390 | 1/1959 | Anrig | 242—86.5 |
| 3,000,587 | 9/1961 | Goode | 242—86.5 |

FRANK J. COHEN, *Primary Examiner.*

NATHAN L. MINTZ, *Examiner.*